Sept. 6, 1938. J. K. ROSS 2,128,967
TELEVISION APPARATUS
Filed March 4, 1936 3 Sheets-Sheet 2
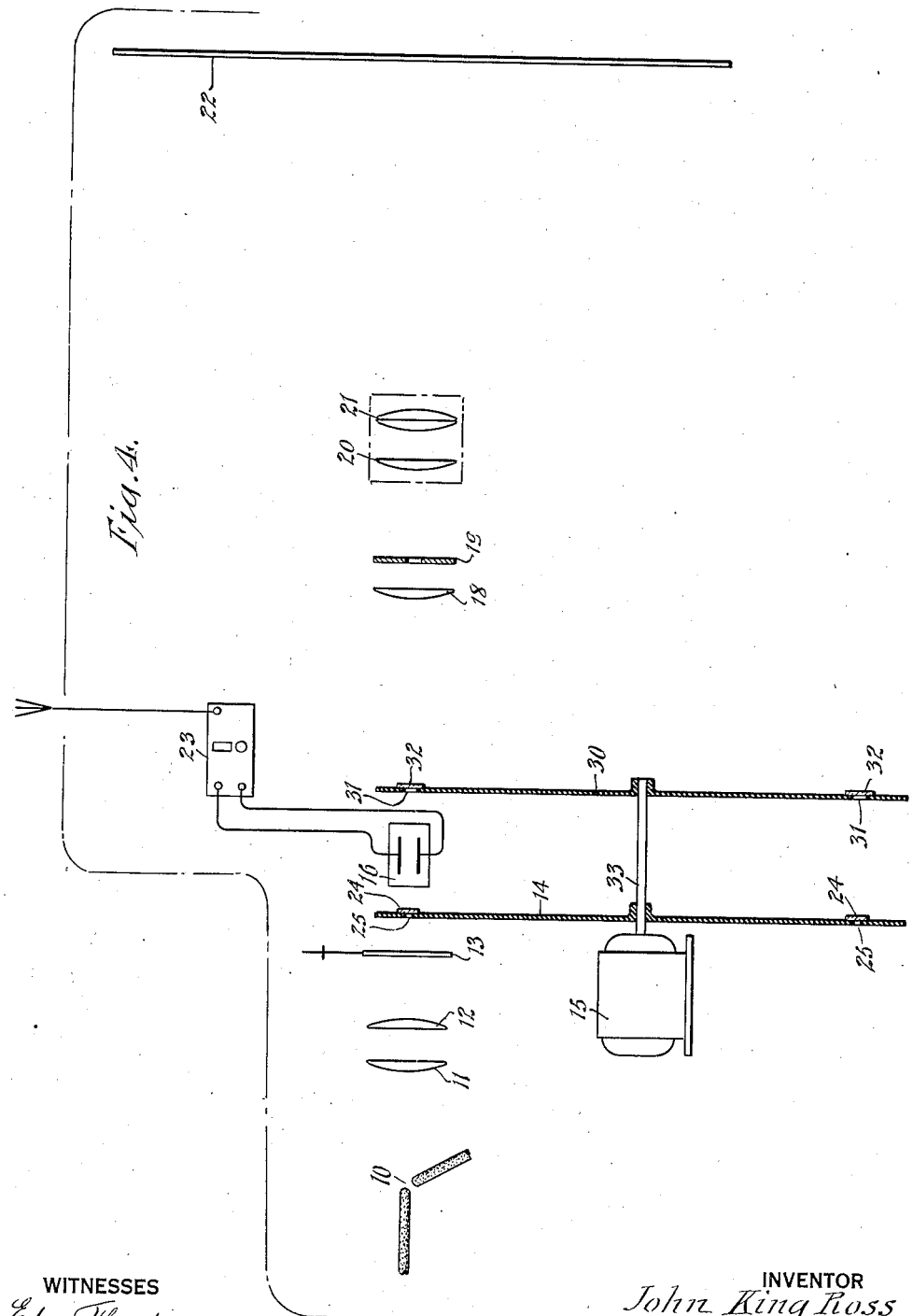

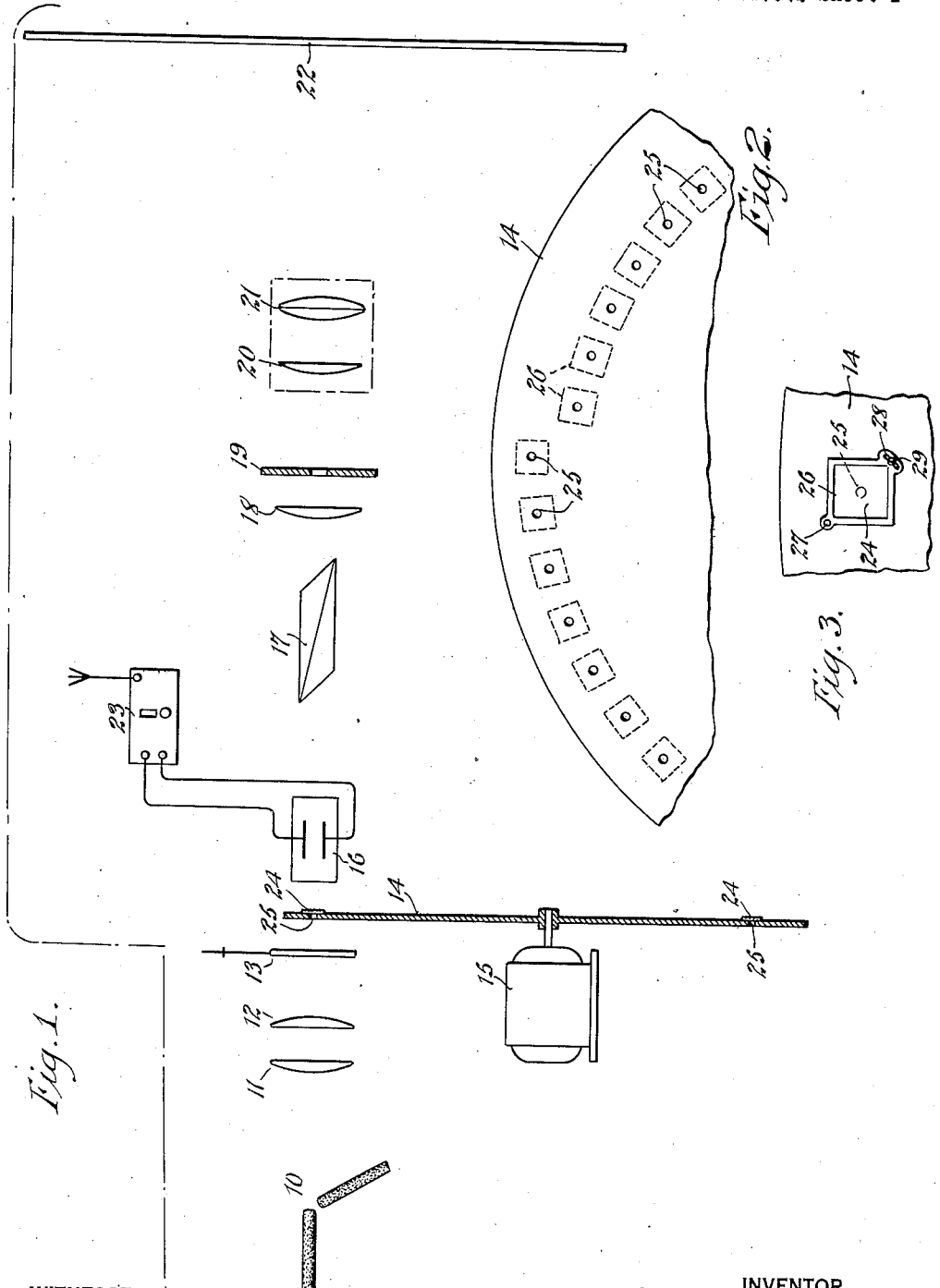

Sept. 6, 1938.   J. K. ROSS   2,128,967
TELEVISION APPARATUS
Filed March 4, 1936    3 Sheets-Sheet 3
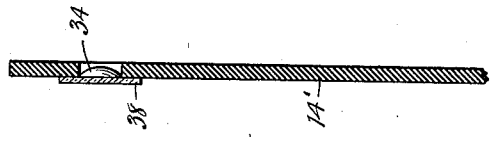
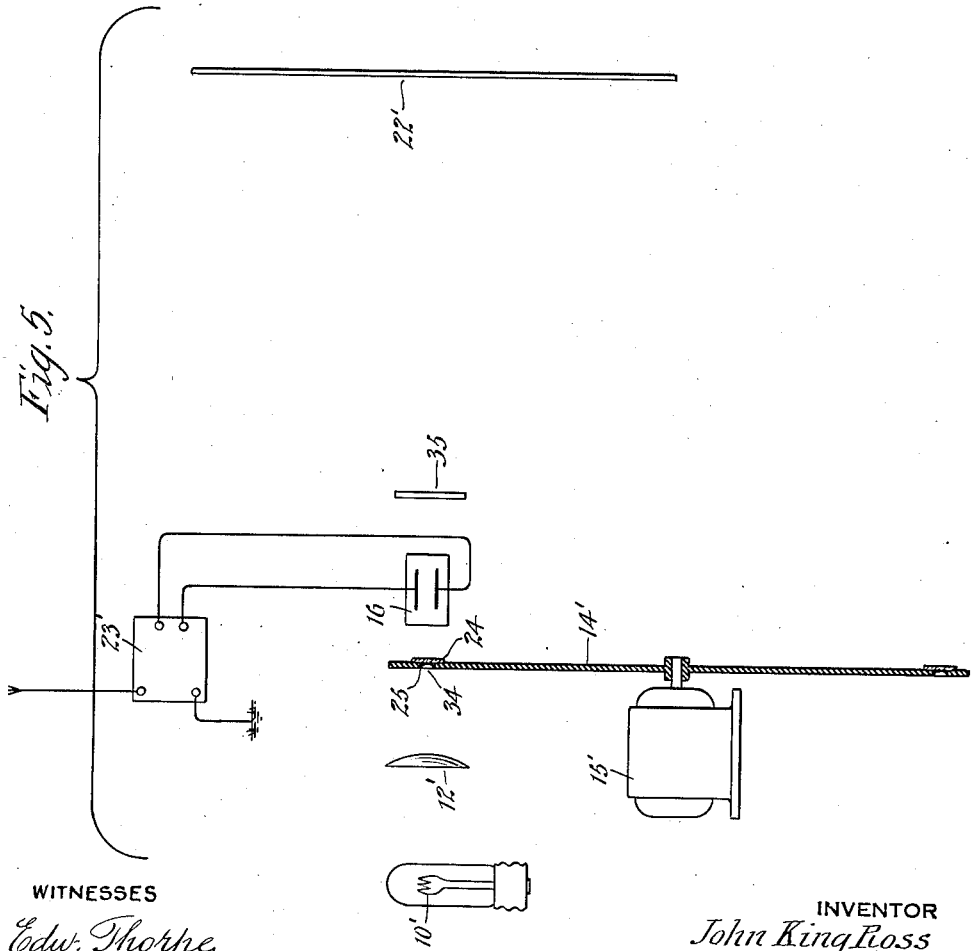
WITNESSES
Edw. Thorpe
A. L. Kitchin
INVENTOR
John King Ross
BY
Munn, Anderson & Liddy
ATTORNEYS Patented Sept. 6, 1938

2,128,967

UNITED STATES PATENT OFFICE 2,128,967

TELEVISION APPARATUS

John King Ross, New York, N. Y.

Application March 4, 1936, Serial No. 66,987

8 Claims. (Cl. 178—7.6)

This invention relates to television apparatus, and has for an object the elimination of the water cell and one of the usual polarizing prisms in a television apparatus.

Another object of the invention is to provide a scanning disc with openings which are covered, each with a polarizing substance.

Still another object of the invention is to mount the scanning disc adjacent and at one side of a Kerr cell, the scanning disc having at each of its openings a polarizing substance which takes the place of the usual polarizing prism which is dispensed with. As the scanning disc is in motion the heat from the arc, or other source of light, is distributed over the polarizing substance at the many openings in the scanning disc and as with this distribution of the heat the polarizing substance cannot be affected by the temperature, the water cell which is now used to protect the usual polarizing prism is dispensed with.

A further object of the invention is to provide a television apparatus which may be confined in less space than is now required, inasmuch as with the elimination of a polarizing prism and a water cell, provided for protecting the polarizing prism, the apparatus may be contracted.

Still a further object of the invention is to provide a television apparatus which makes possible the passage of additional light through the apparatus.

The invention furthermore has as an object to provide a television apparatus having two scanning discs, one disposed at each side of the Kerr cell and each scanning disc having a polarizing substance at its openings.

Additional objects of the invention will appear in the following specification, in which the preferred form of the invention is described.

In the drawings similar reference characters refer to similar parts in all the views, of which:

Fig. 1 is a diagrammatic view illustrating the manner in which the improvements are applied to the television apparatus;

Fig. 2 is an enlarged fragmentary view illustrating a portion of the improved disc;

Fig. 3 is an enlarged view showing the manner in which the polarizing substance is secured to the disc at openings therein;

Fig. 4 is a view illustrating a modified form of the invention;

Fig. 5 is a view similar to Fig. 1 but showing a modified construction of the invention;

Figure 6 is a sectional view showing a modified form of a portion of the disc, illustrating an arrangement of the polarizing agent and lens in an opening of the disc.

It will be understood that while the disc is shown as applied to a particular television apparatus, nevertheless the disc which will shortly be described may be used for various purposes and in other types of television apparatus.

In the apparatus which is shown in the diagrammatic view in the drawings, the incandescent lamp or arc, or other source of light, is shown at 10, condensing lenses are shown at 11 and 12, a shutter or protector is indicated at 13, a disc, which may be the usual scanning disc equipped with polarizing members 24 is indicated at 14, this scanning disc being mounted for rotation by a motor 15, a Karolus, Kerr, or other cell 16, which serves to rotate the plane of polarization, a polarizing substance being indicated at 17, which may be a polarizing prism, a condensing lens being indicated at 18, a diaphragm or mask being indicated at 19, projecting lenses being indicated at 20 and 21 and a screen being indicated at 22.

In the usual type of construction two polarizing prisms are employed, one being disposed at each side of the Kerr cell 16 and in order to protect the polarizing prism, which is disposed between the Kerr cell 16 and the source of light 10, from the heat generated by the arc, a water cell is customarily disposed between this polarizing prism and the arc 10. It is also customary to dispose the disc between the Kerr cell and the screen. It will be understood that inasmuch as one of the usual polarizing prisms is dispensed with and the water cell is also dispensed with, it is possible to contract the apparatus so that it will not require as much space.

As is customary, the Kerr cell 16 receives electrical impulses from the output of a radio apparatus 23 and this Kerr cell serves to rotate the plane of the light which has been polarized by the polarizing substance at the disc openings which will shortly be described, the light being further analyzed by the polarizing substance or polarizing prism 17.

The disc 14 is provided with the usual openings 25 arranged in the customary manner in the form of a spiral, each of these openings 25 being covered by tourmaline 24, or other substance which polarizes light, the disc being rotated by the motor 15 at the desired speed and being positioned so that its openings covered by tourmaline, or other polarizing substance, will be disposed in the path of light from the arc 10 to the Kerr cell 16, one at a time as the disc is rotated. It is, of course, important that the polarizing substance at each of the openings 25 be disposed each with its optical axis in a similar and predetermined direction at the time each opening with its tourmaline, or polarizing substance, registers with the path of light. Preferably the optical axes of the tourmaline, or polarizing substance, are disposed radially at each opening.

As best shown in Fig. 3 of the drawings, the tourmaline 24, or other polarizing substance, is contained in an open frame 26 which is pivoted at 27 to the disc 14 and which has a slot 28 through which a screw 29 is disposed, the screw 29 meshing in an opening in the disc 14. This permits of a slight movement of the frame 26 with its tourmaline 24, or other polarizing substance, so that the optical axis of the tourmaline, or other polarizing substance, may be adjusted relatively to the disc 14.

With the polarizing substance at the openings in the disc, which is disposed between the source of light and the Kerr cell, the customary polarizing prism in this position is eliminated and there is no danger that the heat from the arc or other source of light will damage the tourmaline or other polarizing substance, inasmuch as with the rotation of the disc the heat will be distributed over all the tourmaline members or other polarizing substances. When the disc is not rotated a shutter 13 may be employed to serve as a protector and prevent the heat from heating that portion of the disc and the tourmaline, or other polarizing substance, which is disposed in the path of light.

In the modified form of the invention illustrated in Fig. 4, the polarizing substance or member 17 is dispensed with and a second scanning disc 30 is substituted. The openings 31 in this second scanning disc 30 are preferably approximately twice the diameter of the openings 25 in the scanning disc 14 and the said openings 31 are covered with tourmaline members 32, or other substance which polarizes light. The optical axes of the tourmaline members 32 at the openings 31 are arranged as is the case with the optical axes of the tourmaline members 24 at the openings 25 in the scanning disc 14 and with reference thereto. The tourmaline members 32 are also mounted on the scanning disc 30 in the same manner as are the tourmaline members 24 on the scanning disc 14.

The second scanning disc 30 is mounted on the shaft 33 on which the scanning disc 14 is also mounted to rotate therewith at the same speed. The Kerr cell 16 is disposed between the two scanning discs to operate in the customary manner.

Referring more particularly to Fig. 5 of the drawings, a slightly modified construction is presented wherein certain of the lenses and other parts are eliminated and the scanning wheel is slightly modified. Referring particularly to this figure, it will be noted that the scanning wheel 14' is constructed similar to the scanning wheel 14 of Fig. 1, except that a lens 34 is placed in each of the apertures 25 which makes it possible to eliminate lenses 20, 21 and 18 and the mask 19 as shown in Fig. 1. Also it allows the elimination of the shutter 13. In this form of the invention light from a desired source, as for instance the lamp 10', is concentrated or focussed by means of a condenser lens 12' upon the lens 34. Light passing through the lens 34 will be polarized by the polarizing agent 24, and this light will then pass through the Kerr cell 16 and the polarizing member 35 which analyzes the beam of light before it strikes the screen 22'. It will be noted that the polarizing material 24 is placed over each of the lenses 34, and consequently there will be as many lenses 34 and polarizing agents 24 as there are apertures in the disc 14'.

In Fig. 6 a polarizing member 38 is arranged in front of the lens 34 instead of on the opposite side as shown in Fig. 5. It is to be understood that the motor 15' may be any one of a number of types of suitable electrically driven motors used in television reception. The Kerr cell 16 is operated in the usual way by the output of the receiving set 23'. It will also be noted that the axes of the polarizing substances 24 may be disposed similarly in any direction but must coincide each upon reaching the field of the light beam on the source of light 10'. The axis of the polarizing substance or member 35 may be set arbitrarily in reference to the axes of the various polarizing members 24 according to definition required, brilliance desired, or other factors such as negative or positive image.

I claim:

1. A television scanning device having a series of openings, and individual light polarizing members mounted on said device, and covering the openings respectively.

2. A television scanning disc having a series of openings, a lens in combination with each opening, and a light polarizing crystal in combination with each lens.

3. A scanning device as described in claim 1, characterized in that the polarizing axes of the polarizing members may be adjusted.

4. In combination with a device as described in claim 1, a light source, a Kerr cell, a polarizing element used as an analyzer, a projection lens system, and a screen, all in optical alignment in an area through which the openings of the device pass in the operation thereof.

5. In combination with a disc as described in claim 2, a light source, a Kerr cell, a polarizing element used as an analyzer, and a screen, all in optical alignment in an area through which the openings of the disc pass in the rotation thereof.

6. Television apparatus as described in claim 2 having a light source, a Kerr cell, a polarizing element used as an analyzer, and a screen, all in optical alignment in an area through which the openings of the disc pass in the rotation thereof, characterized in that a projection lens system is positioned between the rotating disc and the screen.

7. In television apparatus including a Kerr cell, discs having apertures therein, said discs being disposed at each side of the Kerr cell, polarizing members covering the apertures respectively, and means to rotate the discs synchronously.

8. Television apparatus as described in claim 7, characterized in that lenses are used in combination with the polarizing members.

JOHN KING ROSS.